United States Patent [19]

Ahlstone

[11] 4,209,193
[45] Jun. 24, 1980

[54] RIGID CONNECTOR FOR LARGE DIAMETER PIPE

[75] Inventor: Arthur G. Ahlstone, Ventura, Calif.

[73] Assignee: Vetco, Inc., Ventura, Calif.

[21] Appl. No.: 797,844

[22] Filed: May 17, 1977

[51] Int. Cl.$^2$ .................. F16L 19/00; F16L 21/08; F16L 37/10
[52] U.S. Cl. .................. 285/309; 285/24; 285/321; 285/332.3; 285/354; 405/251
[58] Field of Search .............. 285/321, 308, 309, 310, 285/354, 388, 24, 27, 18

[56] References Cited

U.S. PATENT DOCUMENTS

| | | | |
|---|---|---|---|
| 2,163,810 | 6/1939 | Raybould | 285/354 X |
| 2,253,018 | 8/1941 | Cowles | 285/321 X |
| 3,345,084 | 10/1967 | Hanes et al. | 285/321 X |
| 3,345,085 | 10/1967 | Hanes | 285/27 |
| 3,361,453 | 1/1968 | Brown et al. | 285/321 |
| 3,455,578 | 7/1969 | Hanes | 285/308 X |
| 3,585,803 | 6/1971 | Bardgette | 285/308 X |
| 3,606,393 | 9/1971 | Huntsinger et al. | 285/321 X |
| 4,012,059 | 3/1977 | Luke et al. | 285/18 |
| 4,050,722 | 9/1977 | Berger et al. | 285/321 X |

FOREIGN PATENT DOCUMENTS

| | | | |
|---|---|---|---|
| 2603566 | 8/1976 | Fed. Rep. of Germany | 285/321 |
| 2304852 | 10/1976 | France | 285/321 |
| 671480 | 5/1952 | United Kingdom | 285/388 |

OTHER PUBLICATIONS

"Joints for Cylindrical Sections, Design Details": from pp. 180–184, *Machine Design*, Jun. 21 1962.

*Primary Examiner*—Roy D. Frazier
*Assistant Examiner*—Carl F. Pietruszka
*Attorney, Agent, or Firm*—Subkow and Kriegel

[57] ABSTRACT

A stab type connector for large diameter pipe has a pin structure and a box structure held in interconnected relation by a locking and loading ring between a circumferential shoulder in the pin structure and a circumferential shoulder on a threaded locking and loading sleeve of the box structure with confronting circumferential pin structure and box structure seating surfaces loaded into engagement. The coengaged and loaded sleeve shoulder and ring and coengaged pin and box structure surfaces transmit axial forces through the connector and resist bending. The connector is useful as a conductor pipe or pile connector.

14 Claims, 5 Drawing Figures

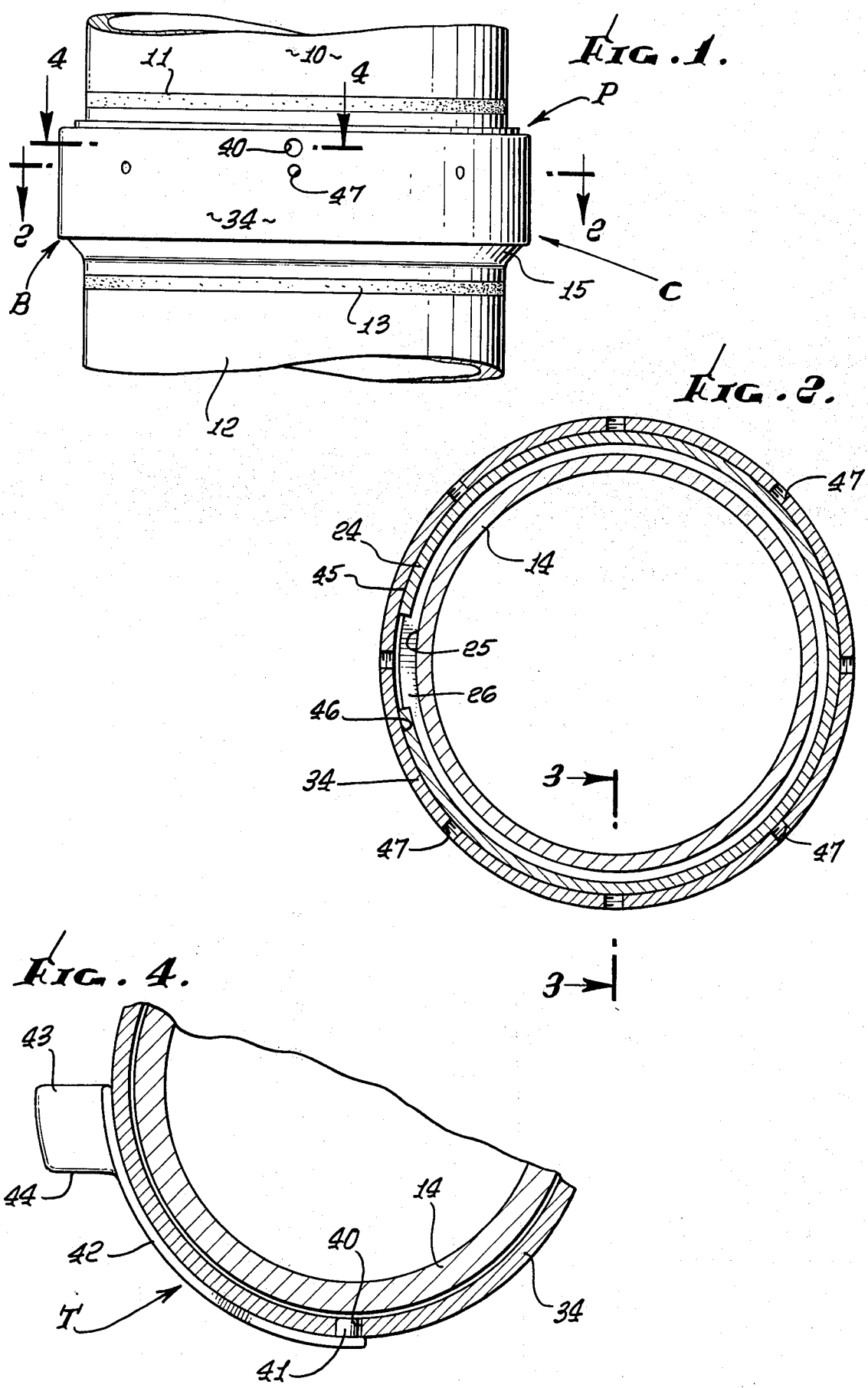

RIGID CONNECTOR FOR LARGE DIAMETER PIPE

Large diameter pipes, say on the order of 30" diameter, are employed in many applications where the connections between pipe lengths are subjected to severe bending forces, tensile forces, other axial separation forces, shock loading and working which tend to cause wear and failure of the connector.

For example, the offshore oil and gas industry utilizes condutor pipes or piles of large diameter which are sometimes driven by pile driving hammers into the ocean bottom. If the connector between lengths of such pipe or piles is capable of working or has looseness, pile driving energy is dissipated or lost. Conductor pipes or piles may be left to stand in the open sea, where such looseness in the connector allows working due to wave, tide, or other sea action, causing the connectors or joints to wear, thereby accentuating the problems inherent in looseness in the connectors. In some cases the connectors may be caused to release by the working action imposed on the pipe by the sea. One form of connector for such uses is that of VETCO OFFSHORE, INC., illustrated at Vol. 4, page 5895, of the "COMPOSITE CATALOG OF OILFIELD EQUIPMENT AND SERVICES", 1976-77, Gulf Publishing Company, Houston, Texas. The attempt to avoid working of such pipe connections by axially overlapping the joint parts is not entirely satisfactory, since the joint or connector parts become very long and heavy, as well as expensive. An example of a connector for large diameter pipe, such as offshore well conductor pipe or piles, wherein the connector is axially loaded to resist pile driving and bending forces is shown in the pending U.S. patent application of Reimert Ser. No. 712,491, filed Aug. 9, 1976 for "Rigid Connector and Piling" and now abandoned.

The present invention involves the provision of a stabtype connector for large diameter pipe or piles which avoids the problems referred to above by permitting little or no movement between the connector parts, the connector being easy to make up and disconnect.

In a specific sense the present invention is an improvement in the connectors of VETCO OFFSHORE, INC., identified above.

In accomplishing the foregoing, the connector is simple and comprises a pin structure and a box structure adapted to be coaxially engaged or stabbed and locked against separation by a locking ring, with confronting transverse shouldering and tapered sealing surfaces loaded into engagement by a threaded sleeve engaging and loading the locking ring, which takes up all looseness in the connector. During pile driving operations the driving force is transmitted through the shouldered and sealing surfaces and the pin body, and the rebound force is transmitted through the pin body, the lock ring, the threaded sleeve and the box member, all of which parts are held tightly together with the pin and box surfaces which project perpendicular to the axis of the connector bearing against one another in a preloaded condition.

Bending forces imposed on the connector are taken through the loaded shoulders and tapered sealing surfaces and through the threaded sleeve and lock ring. This structure, in its loaded condition, is substantially equivalent to having axial overlap between the pin and box equal to the pipe diameter, so that a rigid connection is provided with much less size and material.

In the case of connectors which have pin and box axially overlapped to take bending forces, the bending load is taken into the side walls of the connector parts, with the extent of the axial overlap determining the maximum distance between the resisting movement forces. In the case of the present invention, the connector can be much shorter, and the resisting movement forces are taken at the opposing transverse surfaces about substantially the full connector diameter.

By applying a preload torque to the threaded sleeve, the connection is rendered rigid or non-moveable and the locking ring is wedged between the two structures to hold them in the preloaded condition.

In addition, the connector can be released by simply backing off the threaded locking sleeve to free the locking ring for resilient inward deformation by means of screws carried by the locking sleeve, and the pin and box structures are then separable.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings

FIG. 1 is a fragmentary elevation showing lengths of pipe joined by the present connector;

FIG. 2 is a transverse section taken on the line 2—2 of FIG. 1;

FIG. 4 is a fragmentary transverse section taken on the line 4—4 of FIG. 1, showing a tool applied to the locking sleeve for rotating the same.

Figure 3:
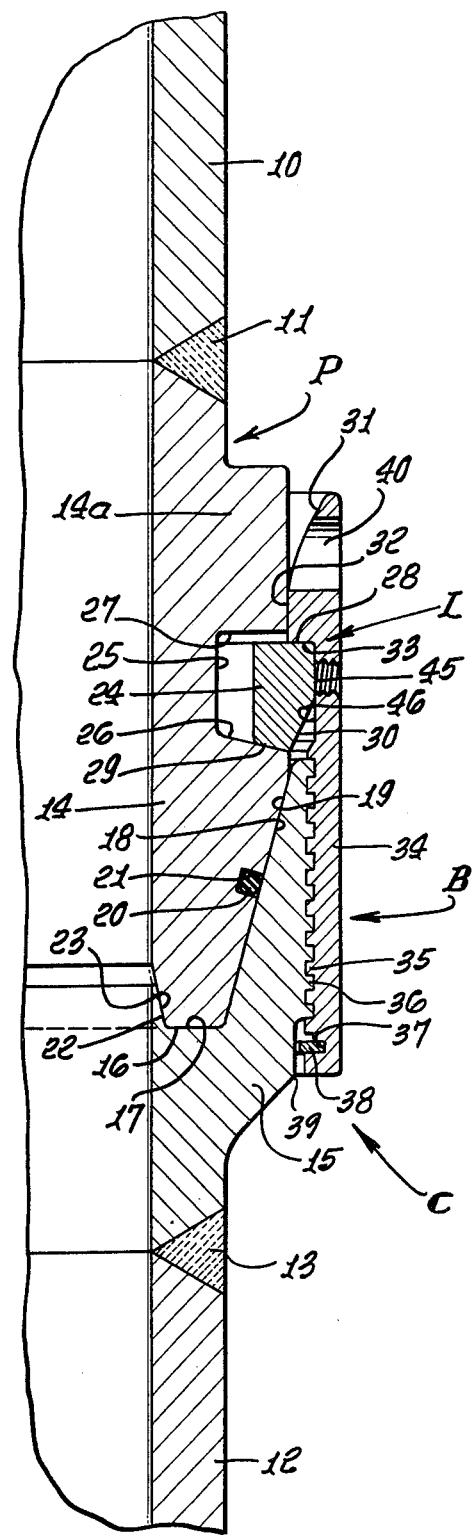
FIG. 3 is an enlarged longitudinal section taken on the line 3—3 of FIG. 2.

As seen in the drawings, a large diameter pipe connector C comprises companion pin structure P and box structure B which can be easily stabbed together and made up to form a rigid connection which can be pile driven. The pin structure P is connected to one length of pipe 10 by means of a circumferentially continuous weld 11, and the box structure B is connected to another length of pipe 12 by means of a circumferentially continuous weld 13. These pin and box structures are adapted to interconnect the pipe sections 10 and 12 together when the pin body section 14 and the box body section 15 are coaxially engaged by stabbing the pin structure into the box structure or moving the box structure end wise over the pin structure, depending upon the use of the connector. Thus, it should be understood that the reference herein to upper and lower portions of the respective connector parts is for convenient reference to the drawings and is not to be taken in a limiting sense. When the connector parts are stabbed together, they are adapted to be locked together by means of locking means L which are adapted to hold the pin and box structures tightly together and against working.

The pin structure P, and more particularly, the body section 14 thereof, is of annular form and its lower end has a transversely extended end or shouldering surface 16 adapted to engage an upwardly facing transverse shoulder or surface 17, provided within the box structure B. Extending upwardly and outwardly, from the lower end 16 of the pin body 14, is an inclined sealing and seating wall 18 engageable against a correspondingly upwardly and outwardly inclined sealing and seating wall 19 within the box structure. A resilient elastomeric seal ring 20 is disposed within an annular groove 21 formed in the pin body in approximately the mid-section of the tapered pin wall 18. At the inner periphery of the lower end of the pin body 14 is an upwardly and inwardly inclined wall 22 engageable with a companion correspondingly upwardly and inwardly inclined wall 23 provided on the box structure and extending upwardly from the bottom wall or shoulder 17 therein.

The lock means L comprises a radially split resilient locking and loading ring 24 expansible and retractible in a circumferentially extended outwardly opening groove 25 formed in the pin body 14 in an upper portion 14a thereof. This groove 25 is bordered by a lower wall or surface 26 which is disposed at an angle inclined downwardly and outwardly with respect to the base or inner wall of the groove 25 and an upper retaining wall 27, with the lock ring 24 normally floating within the groove 25. The lock ring 24 has an upper transverse abutment surface 28 and a lower downwardly and outwardly inclined wedge surface or wall 29 disposed at an angle corresponding to the angle of the bottom wall 26 of the groove in the body. The axial length of the lock ring 24 is less than the distance between the opposed groove walls 26 and 27 to enable the ring to be resiliently deformed circumferentially inward to the extent that it is fully disposed in the groove. Extending upwardly and outwardly from the bottom wall 29 of the lock ring 24 is an inclined camming surface 30 engageable with an upwardly and outwardly arched upper end surface 31 on the box structure upon coengagement of the body parts, whereby the resilient lock ring 24 is circumferentially deformed inwardly into the groove 25, as it moves into the upwardly opening cylindrical bore wall 32 of the box structure, until the upper surface 28 of the lock ring 24 passes below a downwardly facing internal shoulder 33 provided within the box structure and the upper cylindrical pin section 14a is disposed in confronts the bore 32 be engageable therein to limit bending. The locking ring then expands beneath the shoulder 33 so that the pin and box structures are initially loosely interlocked together.

The box structure B also includes a locking and loading sleeve 34, on which the above described shoulder 33 is formed, having an internal square or acme thread 35 engaged with a companion external thread 36 provided on the box body section 15. Adjacent to the lower end of the locking and loading sleeve 34 is an internal groove 37 which receives a split stop ring 38. This lock ring 38 can be installed before the connector is joined together, by threading the sleeve 34 downwardly over the box body 15, so that the groove 37 is spaced well below the lower outer corner 39 of the box body 15 to provide ample annular clearance between the reduced diameter portion of the box body and the inner periphery of the locking sleeve for insertion of the stop ring 38. The stop ring 38 will permit the locking sleeve 34 to be threaded upwardly with respect to the box body to locate the sleeve shoulder 33 for engagement by the upper surface 28 of the lock ring 24 when the connector parts are initially stabbed together.

After the pin and box have been stabbed together, the locking and loading sleeve 34 is adapted to be threaded downwardly with respect to the box body to tightly engage the loading and locking ring 24 between the downwardly facing shoulder 33 on the loading and locking sleeve 34 and the upwardly facing bottom wall or shouldering surface 29 of the groove 25 in the pin body 14. Progressive downward threading of the loading and locking sleeve 34 and compression of the ring against the upwardly facing groove wall 26 can be accomplished by a suitable tool, engageable in one or more radial tool receiving openings or recesses 40 provided in the loading and locking sleeve 34 adjacent its upper end.

An example of such a tool is shown at T in FIG. 4 as comprising a semi-spanner wrench or tool having a pin 41 adapted for engagement in the tool receiving opening 40 of the locking sleeve 34. This pin 41 is provided at one end of an arcuate tool body 42 having at its other end an enlarged abutment or impact lug 43 providing a surface 44 which can be struck by a hammer or impact tool to forcefully drive the locking sleeve 34 rotatively, thereby forcefully loading the locking and loading ring 24 between the locking and loading sleeve and pin body shoulders, and in turn axially loading the confronting tapered pin and box surfaces 18 and 19 and 22 and 23, as well as compressively loading the lower pin end shouldering surface 16 against the box shoulder or surface 17. It is thus possible to eliminate all clearance between the loading and locking sleeve 34, the split ring 24 and the pin body, and the pin and box can be compressively loaded together at the confronting shouldering surfaces thereof, so that the connector is made rigid or relatively non-moveable.

Since the inclined surfaces 26 on the pin and 29 on the locking ring slope downwardly and outwardly, the downward force applied to the lock ring 24 will cause the latter to be forcefully urged expansively or outwardly into tight engagement at its outer circular wall 45 within the bore 46 of the locking and loading sleeve 34, beneath the downwardly facing loading shoulder 33.

When the connector is used in a pile, during pile driving operations, the forces are taken directly through the opposed shouldering and sealing portions of the pin and the box structures. The rebound effect from the pile driving operation is taken through the pin body and the split lock ring to the threaded sleeve and the box structure. All of these surfaces, in both cases, between the box structure and the pin structure project perpendicular to the axis of the connector and are preloaded and bearing against one another, so that working or axial relative movement between the joint parts is not possible.

In the case that a bending force is applied to the rigid connector, the bending loads are taken through the preloaded flat faces 16 and 17 of the pin and box and the flat faces 28 and 33 of the locking ring and the locking sleeve which are preloaded so that the resisting movement forces are located at the confronting flat faces which extend substantially entirely circumferentially of the connector.

Figure 5:
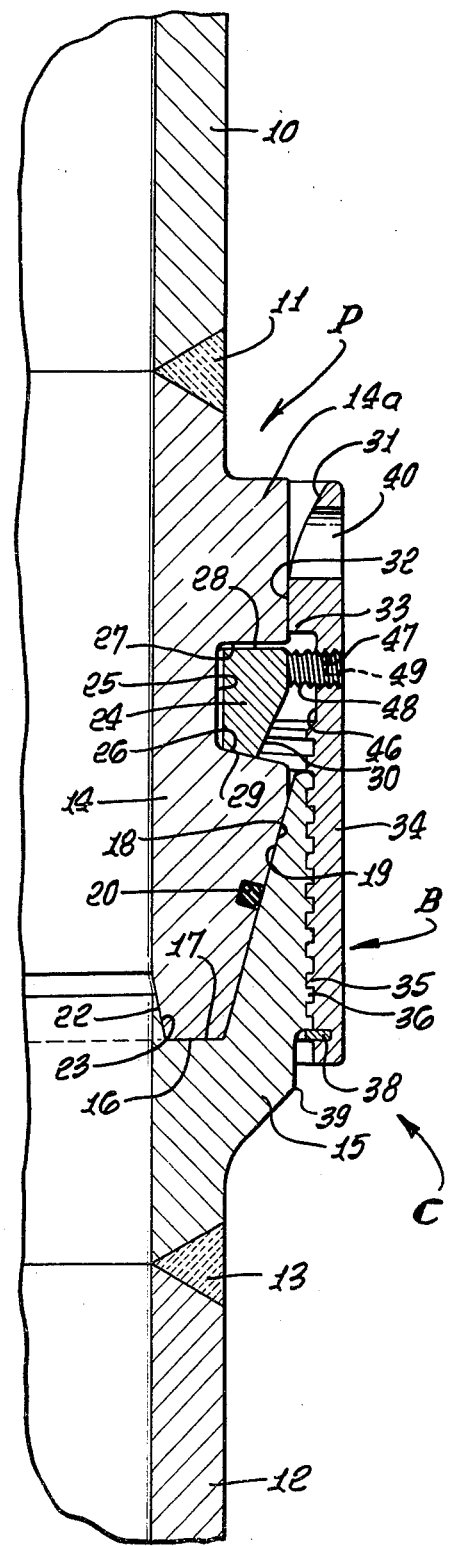
FIG. 5 is a fragmentary longitudinal section, corresponding to FIG. 3, but with the connector released for separation.

The connector can be quickly and easily conditioned for axial separation. Referring to FIG. 5, it will be seen that the loading and locking sleeve 34 has been threaded upwardly with respect to the box body 15 and the pin structure, thereby moving correspondingly upwardly the downwardly facing loading shoulder 33 within the locking sleeve. Upward movement of the locking sleeve has been limited by the stop ring 38 engaging beneath the lowermost thread on the box body, and a number of circumferentially spaced threaded holes 47 within the locking sleeve 34 have been brought into radial alignment with the outer circular wall 45 of the lock ring 24. With the locking sleeve so positioned, the lock ring 24 can be circumferentially inwardly deformed by the use of a plurality of release screws 48 threaded in the threaded openings 47 and having tool engaging sockets means 49, whereby the screws 48 can be progressively moved inwardly to engage the lock ring and deform it inwardly into the groove 25 of the pin body. Since the groove 25 is sufficiently deep in a radial direction to accommodate the entirety of the lock ring 24, in the inwardly deformed condition of FIG. 4, it will be seen that the connector parts can be axially separated, and that the initial outward movement of the pin with respect to the box will move the outer surface 45 of the lock ring into engagement with the locking sleeve, within the upper bore 32, before the surface 45 of the lock ring moves wholly out of engagement with the inner ends of the release screws 48.

In the making up of the connector C, it will be understood that the locking sleeve 24 would also be initially threaded upwardly on the box body to approximately the position of FIG. 5. The pin structure P, with the lock ring 24 projecting somewhat radially outwardly of the ring receiving groove 25, can then be moved axially inwardly with respect to the box structure, the ring camming surface 30 and the arched surface 31 of the locking sleeve progressively wedging the locking ring circumferentially inwardly, as it passes into the locking sleeve upper bore 32. When the upper surface 28 of the lock ring passes the downwardly facing sleeve shoulder 33, the lock ring will inherently expand outwardly beneath the shoulder initially interlocking the pin and box structures against axial separation. Thereafter, threaded rotation of the locking sleeve upon the box body 15, as previously described, will effect the progressive loading of the lock ring 24 downwardly against the pin shoulder or surface 26, causing tight coengagement between the lower shouldering surfaces 16 of the pin and 17 in the box, as well as loading of the inclined opposed sealing surfaces 18 and 19 between the pin and the box structures. Final tightening of the locking sleeve can be accomplished by impact blows applied to the hammer lug 44 of the tool T, so that the connector will be tightly locked together in the preloaded condition. Thus, the connector C is ideally suited for use in connecting large diameter pipes or piles wherein a rigid connection is desired to prevent working of the connector and potential wear or premature disconnection thereof under pile driving forces or under the action of the sea.

I claim:

1. A rigid pipe connector comprising a box body having a transverse first shoulder axially spaced inwardly from an end of said body, a pin body extending within said box body and having a transverse second shoulder abutting said first shoulder, said pin body having an external circumferential groove located beyond said end of said box body defined between axially spaced third and fourth shoulders, a split lock ring in said groove expandable partially outwardly beyond the periphery of said pin body and contractable inwardly completely within said groove, said box body having an external threaded peripheral portion, an internally threaded locking and loading sleeve disposed about said pin body and box body and threadedly meshing with said threaded portion and extending axially outwardly beyond said groove, said sleeve having a fifth shoulder engaging said ring, upon threading of such sleeve along said box body, to force said ring against said third shoulder and said second shoulder against said first shoulder.

2. A rigid connector is defined in claim 1; said third shoulder being inclined outwardly in a direction away from said fifth shoulder, whereby said force exerted by said ring against said third shoulder tends to expand said ring, said sleeve having means engaging said ring to limit outward expansion of said ring.

3. A rigid connector as defined in claim 1; a surface of said locking ring and said third shoulder sloping outwardly of said groove in a direction away from said fifth shoulder and loading said locking ring outwardly.

4. A rigid connector as defined in claim 1; said pin body and said box body having companion tapered sealing surfaces between said third shoulder and said first and second shoulders.

5. A rigid connector as defined in claim 1; said pin body and said box body having companion tapered sealing surfaces between said third shoulder and said first and second shoulders, a surface of said locking ring and said third shoulder sloping outwardly of said groove in a direction away from said fifth shoulder and loading said locking ring outwardly.

6. A rigid connector as defined in claim 1; said pin body and said box body having companion tapered sealing surfaces between said third shoulder and said first and second shoulders, a surface of said locking ring and said third shoulder sloping outwardly of said groove in a direction away from said fifth shoulder and loading said locking ring outwardly, said locking and loading sleeve and said locking ring having respective inner and outer coengaged surfaces limiting outward movement of said locking ring.

7. A rigid connector as defined in claim 1; said locking ring and said locking and loading sleeve having cam surfaces for circumferentially resiliently contracting said locking ring into said groove during initial axial coengagement of said pin body and box body.

8. A rigid connector as defined in claim 1; said locking sleeve being threadedly movable to a position releasing the loaded engagement between said fifth shoulder thereon and said locking ring, and said locking sleeve having shifting means for resiliently deforming said locking ring inwardly to allow axial separation between said pin body and box body.

9. A rigid connector as defined in claim 1; said locking sleeve being threadedly movable to a position releasing the loaded engagement between said fifth shoulder thereon and said locking ring, and said locking sleeve having shifting means for resiliently deforming said locking ring inwardly to allow axial separation between said pin body and box body, said shifting means including elements threaded in said locking sleeve and inwardly shiftable to engage said locking ring.

10. A rigid connector as define in claim 1; said locking and loading sleeve having a cylindrical bore wall spaced outwardly from said fifth shoulder, said pin body having an outer cylindrical wall disposed within said bore wall of said locking and loading sleeve.

11. A rigid connector as defined in claim 1; said locking and loading sleeve having a cylindrical bore wall spaced outwardly from said fifth shoulder therein, said pin body having an outer cylindrical wall disposed within said bore wall of said locking and loading sleeve, a surface of said locking ring and said third shoulder sloping outwardly of said groove and loading said locking ring outwardly.

12. A rigid connector as defined in claim 1; said locking and loading sleeve having a cylindrical bore wall spaced outwardly from said fifth shoulder therein, said pin body having an outer cylindrical wall disposed within said bore wall of said locking and loading sleeve, a surface of said locking ring and said third shoulder sloping outwardly of said groove and loading said locking ring outwardly, said locking and loading sleeve and said locking ring having respective inner and outer coengaged surfaces limiting outward movement of said locking ring.

13. A rigid pipe connector comprising; a box body having a transverse first shoulder axially spaced inwardly from an end of said box body, a pin body extending within said box body and having a transverse second shoulder abutting said first shoulder, a loading sleeve threaded on said box body and having a third shoulder therein, said pin body having a fourth shoulder facing said third shoulder, said pin body and box body having coengagable sealing surfaces, and a loading ring engaging said third shoulder and fourth shoulder and responsive to threading of said sleeve on said box body to transmit the axial force of said sleeve from said third shoulder through said ring to said fourth shoulder to force said first and second shoulders against one another and said coengagable sealing surfaces against one another.

14. A rigid connector as defined in claim 13; said ring being resiliently circumferentially contractable, said sleeve being rotatable on said box member to disengage said third shoulder from said ring and move said third shoulder to a position enabling contraction of said ring, and means on said sleeve engagable with said ring to contract said ring and enable said pin body and box body to be disassembled from one another.

* * * * *